United States Patent [19]

Andersson

[11] 4,343,442

[45] Aug. 10, 1982

[54] ARRANGEMENT IN FISHING REELS FOR COMPENSATING FOR THE LINE RETRIEVAL IN RELATION TO THE BRAKE FORCE ON LINE WITHDRAWAL

[75] Inventor: Jan-Ake Andersson, Mörrum, Sweden

[73] Assignee: Abu Aktiebolag, Sweden

[21] Appl. No.: 174,473

[22] Filed: Aug. 1, 1980

[30] Foreign Application Priority Data

Aug. 10, 1979 [SE] Sweden ................................ 7906702

[51] Int. Cl.$^3$ ...................... A01K 89/01; A01K 89/02
[52] U.S. Cl. ........................ 242/84.2 A; 242/84.5 A; 254/343
[58] Field of Search ...................... 242/84.2 R, 84.2 A, 242/84.21 R, 84.21 A, 84.5 A, 84.51 A, 84.55 R, 84.51 R; 254/343, 347

[56] References Cited

U.S. PATENT DOCUMENTS

| | | | |
|---|---|---|---|
| 2,085,815 | 7/1937 | McCollum | 254/343 |
| 2,896,874 | 7/1959 | Nurmse | 242/218 |
| 3,675,502 | 7/1972 | Sarah | 242/218 |
| 3,697,011 | 10/1972 | Christensen et al. | 242/84.2 A |
| 3,697,012 | 10/1972 | Walker | 242/84.51 R |
| 3,814,349 | 6/1974 | Menne | 242/84.2 A |

*Primary Examiner*—Billy S. Taylor
*Attorney, Agent, or Firm*—Karl W. Flocks; A. Fred Starobin

[57] ABSTRACT

The present invention relates to a fishing reel having a hand crank, a transmission connected to the hand crank for retrieval of the fishing line, and a sliding clutch adjustable by means of a control mechanism for a line spool which is rotatable by means of the line at a pull in the line sufficient to overcome the brake force of the sliding clutch. The invention is characterized by a power transmission mechanism between a transmission element and the sliding clutch, which power transmission mechanism is operable by a torque from the hand crank on line retrieval and adapted, when operated by such torque, to transmit a force corresponding to said torque to the sliding clutch as an addition to the brake force set by means of the control mechanism.

7 Claims, 1 Drawing Figure

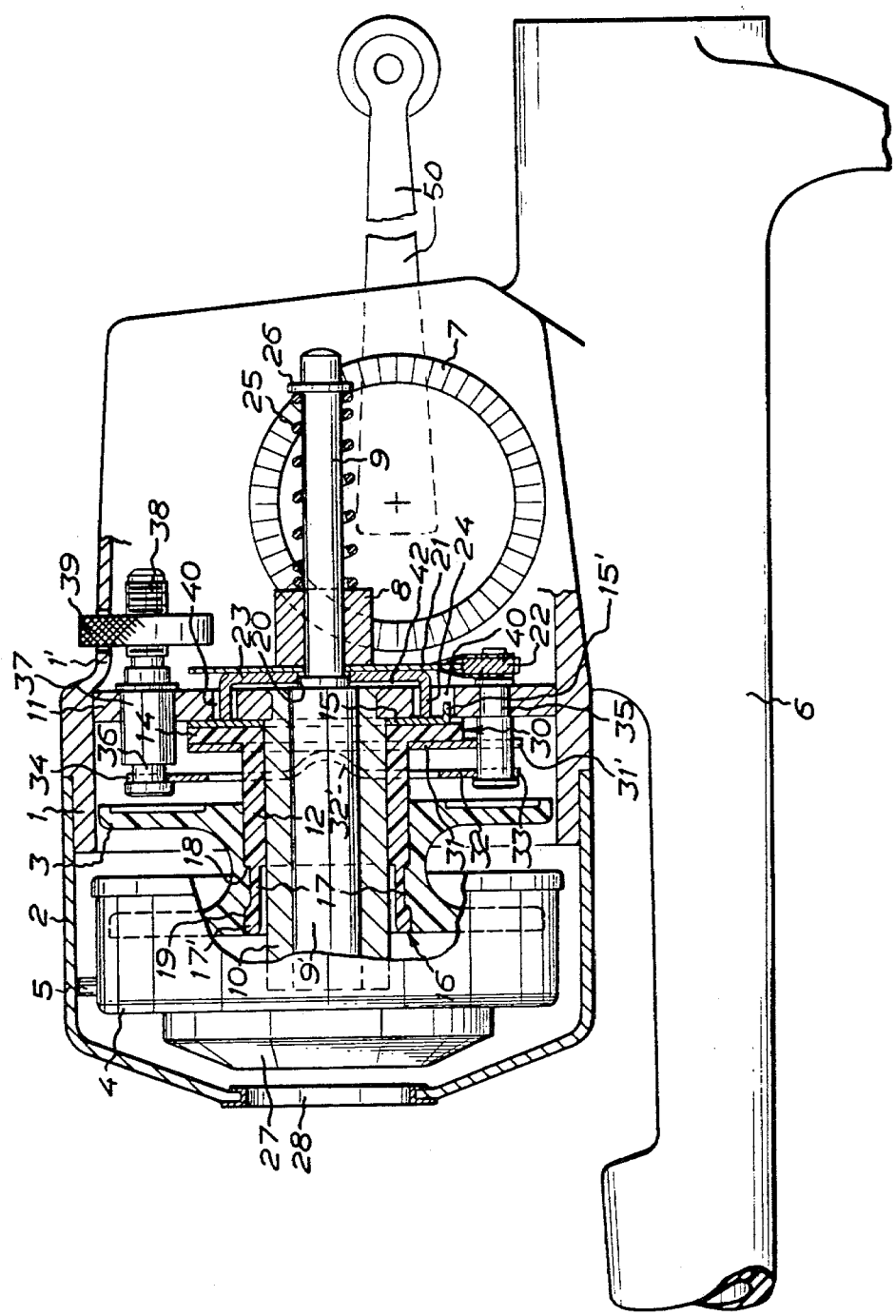

ARRANGEMENT IN FISHING REELS FOR COMPENSATING FOR THE LINE RETRIEVAL IN RELATION TO THE BRAKE FORCE ON LINE WITHDRAWAL

The present invention relates to fishing reels equipped with a sliding clutch and more precisely to an arrangement in such fishing reels for increasing the force acting on the line upon retrieval thereof, without necessitating a change of a certain preset of the sliding clutch, particularly for compensating the line retrieval effect in relation to the brake force against line withdrawal in non-rotary type fishing reels.

In non-rotary type fishing reels there arises, when the line is wound onto the spool, a relatively heavy friction at the points where the line under deflection runs in contact with supporting surfaces, such as against the front flange of the line spool, against the rotor and the line pick-up means and for example against the edge of an opening in a casing surrounding the rotor. In a non-rotary type reel in which the withdrawal of the line from the spool can be braked by means of a sliding clutch the pull at the line must overcome the force of the sliding clutch and also the frictional forces acting upon the line. It is well known that the total brake force against a withdrawal of the line at a certain preset of the clutch is substantially lower than the effective line retrieval force, i.e. the force which is transmitted from the hand crank to the line and acts in the retrieval direction. As a result of this, at a certain clutch preset to provide a given brake force against withdrawal of the line, such as when a fish that has taken the bait makes a run, the sliding clutch cannot even approximately transmit the same force for retrieval of the line. The difference is very great and typically can amount to about 4:1. This means that when presetting the sliding clutch for a brake force of say 4 hg for withdrawal of the line one can obtain a maximum force of 1 hg in the retrieval direction when the line is retrieved at unchanged setting of the slding clutch, which in turn means that at attempts to retrieve the line the sliding clutch will slide as long as the fish exerts a pull in excess of 1 hg. To permit playing a fish that exerts a pull of 4 hg the sliding clutch must therefore be tightened to provide a force of 4 hg for retrieval of the line, but if the fish then suddenly runs and subjects the line to a larger pull the sliding clutch will not slide until the pull at the line exceeds 2 kg. When the angler after tightening of the sliding clutch in this way feels that the fish increases its withdrawal force at the lne, he may perhaps not have time to reduce the brake force before the line breaks.

The object of this invention is to eliminate problems of this kind by providing a fishing reel having an arrangement for compensating for or equalizing such a difference between the line retrieval force and the brake force on line withdrawal.

To this end, the arrangement of the present invention is a fishing reel having a hand crank and a transmission connected to the hand crank for retrieval of the line, and a sliding clutch adjustable by means of a control mechanism for a line spool which is rotatable by means of the line at a pull in the line sufficient to overcome the brake force, comprises a power transmission mechanism between a transmission element and the sliding clutch, said power transmission mechanism being operable by a torque from the hand crank on line retrieval and being adapted when operated by such torque, to transmit a force corresponding to said torque to the sliding clutch as an addition to the brake force set by means of the control mechanism.

Preferred forms of the arrangement according to the invention comprise the following characteristic features.

Said transmission element is a second gear driven by a first gear.

The second gear, in addition to being rotary, is movable in its axial direction a limited distance with retained meshing engagement with the first gear and tends to be moved by the torque of the first gear, when said gear is driven, in that the two gears have teeth which are oblique with respect to their axes of rotation and preferably spirally cut, and the second gear is adapted, by its tendency of being moved by the first gear when said gear is driven by means of the hand crank, to exert an axial pressure force on a movable power transmitting means which in turn is adapted to transmit the corresponding force to the sliding clutch for increasing the brake effect upon retrieval of the line.

The first and second gears together form a right angle per se known in non-rotary type fishing reels, the first gear being of the worm wheel type and driven by the hand crank while the second gear is of the worm type and movably carried on a rotary shaft. The sliding clutch which in a per se known manner comprises at least one friction surface which is non-rotatably arranged with respect to the reel frame, and at least one friction surface which is rotatable together with the spool, is supported close to said second gear by a supporting plate preferably detachably connected to the reel frame, while the line spool which is coaxial with said second gear, is detachably connected to the supporting plate by means of a sleeve and carried at a distance from said supporting plate and at a distance from the sliding clutch, the sleeve being rotatably mounted on a hollow shaft connected to the supporting plate, and having means for resilient snap engagement with the line spool in the hub holes thereof.

The sleeve serving as a bearing for the line spool relative to the hollow shaft has at the end opposite to the line spool a radial flange which constitutes part of the sliding clutch and has two opposed friction surfaces for cooperation with two non-rotatable friction disks which are arranged on either side of the flange and can be clamped against the flange with adjustable force by means of the sliding clutch control mechanism, one of said friction disks being actuated towards said flange by means of said power transmission means.

The sleeve detachably connected to the line spool is axially retained to the supporting plate by means of the sliding clutch.

The movable power transmission means is displaceably guided on said shaft and has at least one axially directed arm which extends through an opening in the supporting plate and is adapted, upon displacement of said second gear, to be urged by said gear directly or via intervening elements against an axially movable element in the sliding clutch, which element is non-rotatable with respect to the wall of the reel frame.

The movable power transmission means is in the form of a ring having several axially directed arms which protrude through openings in the supporting plate and are spaced equal angular distances apart around the periphery of the ring.

Said shaft is a drive shaft known in non-rotary type fishing reels and movably mounted in the fishing reel, which shaft serves to drive the fishing reel rotor equipped with line pick-up means, and/or is an operating rod for displacement of the rotor in relation to the line spool.

The sliding clutch, the operating mechanism thereof, the shaft with said second gear, the fishing reel rotor connected to the shaft, the line spool with its supporting and mounting sleeve, said power transmission mechanism and a means on which the sleeve is mounted, are detachably connected to and supported by the supporting plate, constituting a unit together with said supporting plate to which they are detachably connected.

The invention will be described in greater detail hereinbelow with reference to the accompanying drawing in which a non-rotary type fishing reel having an arrangement according to the invention is illustrated in side view and partly in longitudinal section.

The non-rotary type fishing reel illustrated by way of example in the drawing is a closed type fishing reel, i.e. a reel having a casing 2 mounted on the front portion of the reel frame 1 and enclosing both the line spool 3 and the rotor 4 which carries the line pick-up means 5. The fishing reel is mounted on the upper side of a fishing rod 6.

The rotor 4 is driven from the hand crank 50 of the fishing reel via a transmission which comprises a gear 7 rotatable by means of the hand crank 50 and a pinion 8 in mesh with the gear 7. The gear 7 and the pinion 8 are of the worm and worm-gear type. The pinion 8 is mounted on a shaft 9 which extends coaxially through the line spool and constitutes a drive shaft for the rotor 4 which is detachably connected to the shaft 9, for instance by a screw connection. The shaft 9 in front of the pinion 8 has an enlarged cylindrical portion 9' and is movably and rotatably mounted with this portion in a bearing sleeve 10 which at its rear end is inserted and secured in a hole in a supporting plate 11 which in turn is detachably connected to the reel frame 1 by means of screws (not shown). The bearing sleeve 10 has a cylindrical inner side for accommodating the enlarged portion 9' of the shaft 9, and has a cylindrical outer side on which a sleeve 12 is rotatably mounted. Said sleeve constitutes a supporting and mounting sleeve for the line spool 3. At the rear end the sleeve 12 has a radial flange 14 which engages a disk or washer 15 bearing against the plate 11. The supporting and mounting sleeve 12 is both displaceable and rotatable on the outer circumference of the bearing sleeve 10 and extends through the central hole of the line spool 3 and has a device generally designated 16 at its front end for detachable connection with the line spool. In the illustrated embodiment, the bearing sleeve 10 is of metal and for the bearing purposes described has smooth inner and outer circumferential surfaces of low friction with respect to the shaft portion 9' and the line spool supporting and mounting sleeve 12 which may be made of a suitable plastic material.

In the illustrated embodiment, the connecting device 16 comprises a number of resilient tongues 17 which are integral with the supporting and mounting sleeve 12 of the line spool 3 and extends forwardly from the front end 18 of the sleeve 12 to the front end surface of the line spool 3, said resilient tonques 17 having enlarged front end portions 17' for snap engagement with a groove 19 provided in the front end portion of the inner circumferential surface of the line spool 3. The resilient tongues 17, for example six in number, are spaced equally large distances apart. For reliable, detachable retention of the spool relative to the supporting and mounting sleeve 12 thereof, the line spool 3 may present on its inner circumferential surface at the outer end portion thereof one or more studs (not shown) for engagement in one or more of the gaps between the resilient tongues 17.

The line spool can be mounted to the supporting and mounting sleeve 12 by insertion into said sleeve 12 so that the enlarged end portions 17' of the tongues 17 snap into the groove 19 of the line spool 3. The spool can be removed from the sleeve 12 by exertion of a certain withdrawal force.

The sleeve 12 carries between the pinion 8 and for example a stepped shoulder 20 of the shaft 9 at the transition to the enlarged portion 9' thereof, a sprocket wheel 21 which together with a pawl 22 forms a antireverse mechanism, and a plate 23 which has a number, for example four, axially forwarded directed arms 24.

The plate 23 with its arms 24 has a central function for the arrangement according to the invention, and this function will be described in detail in a following paragraph.

The pinion 8 is shiftably mounted on the shaft 9, but is fixedly connected, in respect of rotation, to the shaft in that its inner periphery has a planar surface in engagement with a corresponding planar surface formed on the shaft 9 and extending in the axial direction thereof. The sprocket wheel 21 is mounted on the shaft 9 in the same way as the pinion 8, i.e. the sprocket wheel is shiftable along the shaft and its hole has a planar surface which fits the longitudinal planar surface of the shaft. The plate 23, on the other hand, is both shiftably and rotatably mounted on the shaft 9. mounted on the shaft 9.

A spring 25 is arranged on the shaft 9, interposed between the pinion 8 and a locking ring 26 at a rear end portion of the shaft 9 to exert a pressure force in the forward direction on the gear 8 which in turn via the sprocket wheel 21 transmits the pressure force to the plate 23.

By means of the shaft 9 which is manually movable by means of an operating button (not shown) at the rear end of the fishing reel, the rotor 4 which is connected to the shaft 9 can be moved forwardly to urge a rubber ring 27 disposed on the front end of the rotor against the casing 2 whereby a fishing line (not shown) which extends from the line spool 3 in a forward direction between the rotor 4 and the casing 2 and out through the front opening 28 of the casing, can be clamped against the casing when a cast is made.

The non-rotary type fishing reel has an adjustable sliding clutch generally designated 30, acting between the plate 11 connected to the reel frame and the supporting and mounting sleeve 12 of the line spool 3. By a pull at the line the line spool 3 can be rotated in the reverse direction for paying out line provided that the torque exerted by the line on the line spool exceeds the brake force of the sliding clutch 30. On retrieval of the line by means of the hand crank 50 the rotor 4 with the line pickup means 5 is rotated, but the line spool 3 is not then rotated unless the pull at the line in the line withdrawal direction at the same time is so large that the clutch slides, in which case both the rotor and the line spool rotate at the same rpm or at different rpms depending upon the degree to which the clutch slides. By setting of the clutch the extent to which the line spool takes part in the rotation upon line retrieval can be reduced such that the rotor rotates more rapidly than does the line spool, which is necessary in order that the line shall be wound onto the line spool upon line retrieval. Principally, it is possible by firm tightening of the clutch to block the line spool in relation to the reel frame.

The already described flange 14 on the supporting and mounting sleeve 12 for the line spool forms part of the sliding clutch 30 and has the same function as a friction washer fixedly connected to the supporting and mounting sleeve 12, and said friction washer, together with the afore-mentioned washer 15 on the fixed plate 11 on one side of the flange 14, and a washer 31 on the other side of the flange 14 constitutes a set of brake disks the braking effect of which between the supporting and mounting sleeve 12 of the spool 3, on the one hand, and the fixed plate 11, on the other hand, is controllable by means of a control mechanism. Said mechanism comprises a ring 32 functioning as a lever and having two fork-shaped projections 33, 34, which are diametral to one another and each of which straddles a guide pin 35 and 36, respectively, carried by the supporting plate 11.

The arrangement is such that the ring/lever 32 is axially displaceable over a limited distance along the guide pins 35, 36 and besides is articulated in relation to them. The ring 32 serving as lever surrounds the supporting and mounting sleeve 12 of the line spool 3, leaving a relatively large clearance, and each ring half (only one ring half is shown in the drawing) has a rearwardly curving central portion 32'. Each of these two curving portions 32' bear against one part of an adjoining brake disk 31 which is movably mounted on the supporting and mounting sleeve 12 of the line spool but is non-rotatable in relation to the reel frame as it has a fork-shaped projection 31' which straddles one 35 of said guide pins 35, 36. The other guide pin 36 is connected to a quadrangular block 37 which is movably mounted in a quadrangular hole in the plate 11 so that it cannot rotate but be axially shifted in relation to the plate. By exertion of an axially rearwardly directed force on the block 37 said block can be displaced in relation to the plate 11 for pulling the ring/lever 32 rearwardly for exertion of pressure against the set of brake disks.

An extension in the form of a threaded pin 38 runs in a rearward direction from the block 37, and a nut 39 is disposed on the pin. The nut bears with its side facing the block 37 against an abutment surface on a reel frame part 1'. The nut 39 has a knurled circumferential surface which projects out of the frame so that it is accessible as a wheel for finger operation. By tightening the nut 39 against the abutment surface of the frame part 1' the annular lever 32 can be pressed with its curving portions 32' against the set of brake disks. The tightening force can be regulated by means of the nut 39.

Sliding clutch arrangements of the type described are known but only in principle and not in the simple practical embodiment described.

However, to the extent the sliding clutch arrangement has been described so far, it suffers from the same drawback as that described by way of introduction.

This drawback has now been overcome by the invention which provides an arrangement, described in the following, which incorporates the afore-mentioned plate 23 with its arms 24.

As illustrated in the drawing said arms 24 extend through holes 40 in the plate 11 connected to the reel frame and reach with their ends up to the friction disk or washer 15 closest to the plate 11. The washer 15 is nonrotatable in relation to the plate in that it has a lug 15' which projects into one of the holes 40.

By exertion of pressure in axial direction on the plate 23 the arms 24 can be urged against the friction washer 15 so that a stronger compression of the washers 15, 31 and the intervening sleeve flange 14 is realized against the curving portions 32' of the ring/lever 32 for increase of the brake pressure.

As already described, the pinion 8 and the sprocket wheel 21 are mounted movable on the shaft 9 towards the plate 23. Said plate has a small axial clearance 42 before it reaches the plate 11. For each setting of the sliding clutch 30 by means of the nut 39 the brake pressure can therefore be increased considerably by a displacement of the pinion 8 towards the plate 23.

Such an axial displacement of the pinion 8 can be automatically realized in a very simple manner upon retrieval of the line in that the teeth of the gear 7 and the pinion 8 are spirally cut in such a direction that the gear 7 tends to move the pinion 8 in an axial direction forwardly on the shaft 9 when the transmission 7, 8 is driven by means of the hand crank.

The greater force exerted by means of the hand crank for winding the line onto the line spool against a certain resistance by a pull at the line in the paying-out direction, the greater is the braking effect of the sliding clutch, but in the embodiment illustrated said braking effect can not however be increased beyond the limit at which the arm carrying plate 23 engages the plate 11 connected to the reel frame.

If it is felt upon retrieval of the line that the resistance threatens to reach a degree at which the line may break, one only need release the hand crank to check whether a force acting on the line in the withdrawal direction produces sliding of the clutch or not. If no such sliding occurs the pull at the line in the withdrawal direction has not reached the brake force set for the sliding clutch by means of the nut 39; but even if such sliding occurs when the hand crank is at rest, one can without any risk commence retrieval of the line by means of the hand crank as one knows the relation between the retrieval force and the brake force, for if the withdrawal force exceeds the brake force, the sliding clutch will slide.

The technical solution of allowing the friction force to act upon a relatively stable surface, viz. the flange 14 of the spool, close to the supporting plate 11 and thus as close as possible to the pinion 8, has been selected firstly in order to permit a simple and practical power transmission from the pinion 8 to the set of brake disks, but it has been found that this solution gives secondary advantages. In addition to forming a simple and practical arrangement for detachable mounting of the line spool 3 and journalling the line spool on the bearing sleeve 10, the supporting and mounting sleeve 12 constitutes a mechanism for power transmission from the set of the brake disks to the center of the line spool 3 and thus replaces the conventional location of the sliding clutch for direct action upon the outer side of the spool flanges, which usually results in a varying brake force depending upon the amount of line on the line spool. The spool flanges in fact are always more or less elastic, and the brake force therefore usually increases with an increasing amount of line on the line spool.

The further advantage has been gained by the construction illustrated that the most vital parts thereof can be mounted and dismounted as a unit in that they are supported on a single supporting plate 11. After removal of the casing 2 and optional dismounting of the rotor 4 from the shaft 9 and after retraction of the line spool from the sleeve 12, the plate 11 can in fact be removed from the reel frame 1 simply by unscrewing some screws, whereafter the shaft 9 with the spring 25 and the pinion 8 as well as the plate 11 and the two sleeves 10, 12 along with the entire set of brake disks can be removed as a unit.

It will be realized from the foregoing that the construction according to the present invention is very practical and expedient. A great advantage resides in that the force for retrieval of the line which is exerted by means of the hand crank produces an axial force by reason of the tendency of the pinion 8 to be shifted axially forwardly and that this force automatically increases the brake force acting upon the line spool on retrieval of the line and, in other words, the pull at the line which is exerted by means of the hand crank via the rotor 4 and the line pick-up means 5 upon retrieval of the line. If the brake is adjusted for sliding at a certain withdrawal force at the line, say 2 kg, and the line is known to withstand the stress one can also, without changing the clutch preset by means of the control mechanism of the clutch, retrieve the line at a pull up to said limit as distinct from a maximum of about $\frac{1}{4}$ of said force, that is about 0.5 kg, in non-rotary type fishing reels having a conventional sliding clutch. The approximate pull that a fish exerts on the line is readily controlled. For example by releasing the hand crank one can check whether the fish is capable of taking line against the preset brake force and, in such a case, how rapidly the clutch slides. As long as the fish is not capable of taking line, it is always possible to exert a sufficient force by means of the hand crank to haul in the fish, and this can be done without any risk of line rupture, and also if the line is withdrawn under moderate sliding of the clutch it is possible to increase the braking effect by means of the hand crank and play the fish within the limits of what the line withstands without necessitating a change of the preset of the clutch by means of the adjusting device thereof. By releasing the hand crank or reducing the retrieval force one can rapidly reduce the resistance against withdrawal of the line down to the force for which the sliding clutch is set and will slide.

The arrangement according to the invention provides corresponding advantages when one has to disengage a bait that has got hung up in say a weed bed.

As for the structural details the invention is not restricted to the embodiment described in the foregoing and its principles are not either restricted to non-rotary type fishing reels of the embodiment illustrated or to non-rotary type fishing reels on the whole. For it is conceivable to employ the same principle for increasing the brake force in a multiplier reel or a fly fishing reel although the problems outlined in the introduction with greatly differing withdrawal and retrieval forces seldom arise or in any case are not very significant in reels of the last-mentioned type.

A conceivable modification of the embodiment illustrated in the drawing and described above is to equip the fishing reel with a device for disconnecting the supplemental brake force from the hand crank. Such a device (not shown) might comprise a fork-shaped rail which is movably mounted in the reel frame 1 and can be pushed from the outer side of the reel downwards as an abutment between for example the shoulder 20 on the shaft 9 and the plate 11 to prevent forward displacement of the pinion 8.

Another conceivable modification is to use an additional gear for increase of brake force instead of the pinion 8 which can then be reduced to its ordinary task of driving the rotor 4 via the shaft 9.

The brake force increasing device 8, 22, 23 might also be supplemented with means transmitting the supplemental brake force with multiplication or demultiplication or with lever action, and the supplemental brake force might possibly be regulated or moderated by a suitable device such as a progressively acting spring which constantly regulates the supplemental brake force from the hand crank to between 3 and 5 times the resistance of the sliding clutch against withdrawal of the line.

These and other modifications made possible by the invention fall within the scope of the invention defined by the appended claims.

What we claim and desire to secure by Letters Patent is:

1. In a fishing reel having a frame, a line spool rotatably supported by said frame, a hand crank, transmission means and line retrieval means connected to and rotated by said hand crank via said transmission means for retrieval of the line and winding it onto the line spool, and a sliding clutch comprising coaxially mounted friction members, one such friction member being non-rotatably fixed in relation to said frame and another friction member being connected to be rotated with said line spool, said friction members being axially adjustable into friction contact with each other for providing an adjustable brake force against rotation of said line spool, a control mechanism (32, 37-39) for adjusting the degree of frictional contact pressure between said friction members, said line spool being rotatable by means of the line at a pull in the line sufficient to overcome said brake force and bring said clutch to slide, the improvement comprising a power transmission mechanism connected between said hand crank and said sliding clutch for converting a torque from said hand crank into a force which tends to increase said contact pressure preset by said control mechanism, said power transmission mechanism comprising first and second cooperating members, said first member being rotatable and connected to be acted upon by said torque from said hand crank and said second member being movable by torque from said first member and connected to said clutch to press said friction members together with a force depending on said torque.

2. The fishing reel as claimed in claim 1, wherein said first and second members are first and second rotatable gears forming part of said transmission means and having helically cut meshing teeth, said second gear being rotatable by said hand crank via said first gear and being axially movable a limited distance with retained meshing engagement with said first gear to be pushed in an axial direction by torque from said first gear (7).

3. The fishing reel as claimed in claim 1, wherein said transmission means comprises, further to said first and second cooperating members which also form part of said power transmission means, a rotatable shaft, said second cooperating member being mounted slidably on and in rotational engagement with said shaft, said line spool and said first and second members being supported coaxially in relation to each other, the fishing reel further comprising a first sleeve which is fixed in relation to said frame and in which said shaft is rotatable and axially movably guided, and a second sleeve rotatably and detachably mounted on said first sleeve, said line spool having a hub and being mounted on a portion of said second sleeve and rotatably supported thereby on said first sleeve, said first sleeve being fixed to a supporting plate which in turn is detachably fixed to said frame and said first sleeve comprising means forming said one friction member which is rotatable with said line spool.

4. The fishing reel as claimed in claim 3, wherein said second sleeve at one end thereof adjacent said supporting member has a radial flange which constitutes said one friction member which is rotatable with said line spool, said flange having opposite friction surfaces, said friction members comprising a pair of non-rotatable friction plates which are mounted on either said of said flange and are detachably and non-rotatably but axially movably fixed to said frame in coaxial relationship with said first and second cooperating members, said line spool and said second sleeve having means for detachable snap engagement with each other.

5. The fishing reel as claimed in claim 4, wherein first and second non-rotatably mounted squeezing elements have said flange and said non-rotatable friction plates mounted therebetween, said first squeezing element being fixed in relation to said frame and said second squeezing element being mounted axially movable and arranged to be axially moved by said second cooperating member in the direction of said first squeezing element to bring said friction members of said sliding clutch to be squeezed therebetween with a force depending on said torque.

6. The fishing reel as claimed in claim 5, wherein said line spool, said sleeves, said friction members and said first squeezing element are detachably mounted as an assemblage on said shaft, said assemblage comprising connecting means detachably connecting said assemblage with said supporting member to form a detachable unit therewith.

7. The fishing reel as claimed in claim 6, wherein said second axially movable squeezing member is in the form of an annular member having a plurality of axially directed arms and wherein said supporting member is in the form of a plate having a central opening for said shaft to pass through and a plurality of openings radially outwardly of said central opening, an axially movable friction member adjacent said plate with openings therethrough, said arms extending through said plurality of openings and protruding into contact with said adjacent axially movable friction member.

* * * * *